United States Patent Office 3,523,934
Patented Aug. 11, 1970

1

3,523,934

PHENYL-AZO-NAPHTHOL LAKES

Heinz Haubrich, Leverkusen, Germany, assignor to Farbenfabriken Bayer Aktiengesellschaft, Leverkusen, Germany, a corporation of Germany No Drawing. Filed Apr. 14, 1967, Ser. No. 630,796
Claims priority, application Germany, Apr. 23, 1966, F 49,002; May 6, 1966, F 49,137
Int. Cl. C07c *107/08;* C09b *45/14*
U.S. Cl. 260—151 1 Claim

ABSTRACT OF THE DISCLOSURE

Pigment dyes laked with salts of calcium and/or manganese which comprise diazotised 1 - methyl-3-amino-6-chlorobenzene-4-sulfonic acid or diazotized 1-methyl-4-aminobenzene-3-sulfonic acid coupled with 2-hydroxy-naphthalene-3-carboxylic acid-6-sulfonic acid.

It has been found that valuable new pigment dyes are obtained when diazotised 1-methyl-3-amino-6-chlorobenzene-4-sulphonic acid or diazotised 1-methyl-4-aminobenzene-3-sulphonic acid are coupled with 2-hydroxy-naphthalene-3-carboxylic acid-6-sulphonic acid and the azo dyestuffs so obtained are laked with salts of calcium and/or of manganese. As salts of calcium or manganese, there are suitable, among others: calcium chloride, manganese chloride, calcium sulphate, manganese sulphate, calcium acetate, manganese acetate, calcium formate and other customary calcium and manganese salts suitable for laking.

The new pigment dyes are insoluble in water and the customary organic solvents; they are distinguished by outstanding fastness to overvarnishing in nitroalkyd resin lacquers or stoving lacquers, by high fastness to migration in plastics and by good light-fastness and are therefore particularly suitable for the dyeing of lacquer, paper and plastics masses.

Example 1

22.2 g. 1-methyl-3-amino-6-chlorobenzene-4-sulphonic acid are stirred fine with 600 ml. water and 28 ml. hydrochloric acid (19.5° Bé.) and diazotised at 0–10° C. with 23 ml. 30% sodium nitrate solution. 25 ml. glacial acetic acid and then an aqueous solution of the sodium salt of 27 g. 2-hydroxy-naphthalene-3-carboxylic acid-6-sulphonic acid are added to the diazotisation. After coupling has ended, 18 g. calcium chloride are added and heating to 90° C. is effected for 2 hours, followed by filtering off with suction, washing, and drying at 50–60° C.

3 g. of the Ca-laked pigment dye so obtained are ground in 100 g. of a nitroalkyd resin lacquer (with a solid content of 22%) in a hopper mill. With the lacquer adjusted to spraying viscosity, red lacquerings with very good fastness to overvarnishing can be prepared.

The dyestuff is of equally outstanding suitability for the preparation of graphic prints which are fast to solvents as well as for the migration-fast dyeing of plastics masses.

When, in this example, the calcium chloride is replaced by an equivalent amount of manganese chloride, a coloured lacquer with similar properties is obtained the shade of which is, however, distinctly bluer than that of the calcium lacquer.

2

Example 2

18.7 g. 1-methyl-4-aminobenzene-3-sulphonic acid are stirred fine with 600 ml. water and 28 ml. hydrochloric acid (19.5° Bé.) and diazotised at 0–10° C. with 23 ml. 30% sodium nitrite solution. 25 ml. glacial acetic acid and then an aqueous solution of the sodium salt of 27 g. 2-hydroxy-naphthalene-3-carboxylic acid-6-sulphonic acid are added to the diazotisation. After coupling has ended, 18 g. calcium chloride are added and heating to 90° C. is effected for 2 hours, followed by filtering off with suction, washing, and drying at 50–60° C.

3 g. of the Ca-laked pigment dye so obtained are ground in 100 g. of a nitroalkyd resin lacquer (with a solid content of 22%) in a hopper mill. With the lacquer adjusted to spraying viscosity red lacquerings with very good fastness to overvarnishing can be prepared.

The dyestuff is of equally outstanding suitability for the preparation of graphic prints which are fast to solvents as well as for the migration-fast dyeing of plastics masses.

When, in this example, the calcium chloride is replaced by an equivalent amount of manganese chloride, a coloured lacquer with similar properties is obtained the shade of which is, however, distinctly bluer than that of the calcium lacquer.

I claim:

1. Calcium or manganese lakes of azo dyestuffs selected from the group consisting of an azo dyestuff of the formula

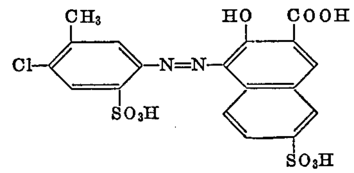

or of an azo dyestuff of the formula

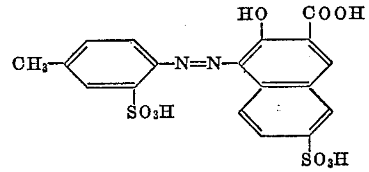

References Cited

UNITED STATES PATENTS

| | | | |
|---|---|---|---|
| 741,029 | 10/1903 | Gley et al. | 260—203 |
| 983,486 | 2/1911 | Ernst et al. | 260—202 |
| 1,818,778 | 8/1931 | Alleman | 260—202 X |
| 2,225,665 | 12/1940 | Siegel | 260—202 X |

OTHER REFERENCES

Georgievics and Grandmougin: Dye Chemistry, Trans. F. A. Mason, London: Scott, Greenwood & Son, 1920, p. 19.

CHARLES B. PARKER, Primary Examiner

C. F. WARREN, Assistant Examiner

U.S. Cl. X.R.

260—37, 201; 106—288; 117—154